United States Patent
Chen et al.

(10) Patent No.: US 11,178,806 B2
(45) Date of Patent: Nov. 23, 2021

(54) COMBINED GAGE WHEEL AND INTEGRATED TRANSPORT SYSTEM

(71) Applicant: Deere & Company, Moline, IL (US)

(72) Inventors: Jixin Chen, East Moline, IL (US); Michael L. Vandeven, Princeton, IA (US)

(73) Assignee: Deere & Company, Moline, IL (US)

( * ) Notice: Subject to any disclaimer, the term of this patent is extended or adjusted under 35 U.S.C. 154(b) by 384 days.

(21) Appl. No.: 16/240,225

(22) Filed: Jan. 4, 2019

(65) Prior Publication Data
US 2020/0053949 A1 Feb. 20, 2020

Related U.S. Application Data

(60) Provisional application No. 62/764,936, filed on Aug. 15, 2018.

(51) Int. Cl.
*B62D 13/00* (2006.01)
*A01B 73/00* (2006.01)
(Continued)

(52) U.S. Cl.
CPC .......... *A01B 73/005* (2013.01); *A01B 69/005* (2013.01); *A01B 69/007* (2013.01);
(Continued)

(58) Field of Classification Search
CPC ........ B62D 7/1536; B62D 7/18; B62D 13/00; B62D 13/04; B62D 13/025; B62D 11/02;
(Continued)

(56) References Cited

U.S. PATENT DOCUMENTS 2,174,493 A * 9/1939 Vanderwerf ......... B62D 13/005
 280/426
3,212,793 A * 10/1965 Pietroroia .............. B62D 13/04
 280/443
(Continued)

FOREIGN PATENT DOCUMENTS

CA  1188899 A  6/1985
CA  2750951 A1 8/2012
(Continued)

OTHER PUBLICATIONS

European Search Report issued in counterpart European Patent Application No. 19020468.5 dated Jan. 28, 2020 (6 pages).
(Continued)

*Primary Examiner* — Adam J Behrens
(74) *Attorney, Agent, or Firm* — Foley & Lardner LLP (57) ABSTRACT

The present disclosure relates to a steering system for an agricultural machine. The steering system includes a first and second wheel assembly. Each wheel assembly includes an axle assembly including an axle, wheels rotatably connected to the axle, and a double-action hydraulic cylinder. In some embodiments, the double-action hydraulic cylinder is configured to pivot the wheels in either direction to indicate a direction of turn. In some embodiments, the double-action hydraulic cylinder of the first wheel assembly is hydraulically linked in its operation to an operation of the double-action hydraulic cylinder of the second wheel assembly.

14 Claims, 4 Drawing Sheets

(51) Int. Cl.
*A01D 75/00* (2006.01)
*A01B 69/00* (2006.01)
*B62D 7/18* (2006.01)
*A01B 69/06* (2006.01)
*A01B 73/06* (2006.01)

(52) U.S. Cl.
CPC ............ *A01B 73/06* (2013.01); *A01D 75/002* (2013.01); *B62D 7/18* (2013.01); *B62D 13/00* (2013.01)

(58) Field of Classification Search
CPC ... A01B 69/002; A01B 69/003; A01B 69/005; A01B 69/006; A01B 69/007; A01B 73/005; A01B 73/06; A01D 75/002
USPC .............. 280/426, 442, 443; 180/414
See application file for complete search history.

(56) References Cited

U.S. PATENT DOCUMENTS

| | | | |
|---|---|---|---|
| 3,245,695 A | 4/1966 | Bernard | |
| 3,721,461 A | 3/1973 | Nelsen et al. | |
| 4,460,193 A | 7/1984 | Dietz et al. | |
| 4,603,873 A * | 8/1986 | Perlini | B62D 7/148 180/409 |
| 4,824,135 A * | 4/1989 | McGregor | B62D 13/04 280/400 |
| 5,243,810 A | 9/1993 | Fox et al. | |
| 5,477,937 A * | 12/1995 | Chagnon | B62D 7/144 180/24.01 |
| 5,529,447 A | 6/1996 | Bruns et al. | |
| 5,904,365 A * | 5/1999 | Dillon | B62D 13/005 280/419 |
| 6,209,297 B1 | 4/2001 | Yeomans et al. | |
| 7,197,865 B1 | 4/2007 | Enns et al. | |
| 7,874,571 B2 * | 1/2011 | Frey | B60G 3/14 280/442 |
| 7,926,249 B1 | 4/2011 | Cook | |
| 7,926,833 B2 * | 4/2011 | Hellbusch | B62D 13/02 280/442 |
| 8,769,920 B2 | 7/2014 | Patterson et al. | |
| 8,870,210 B2 * | 10/2014 | Smith | A01B 73/005 280/444 |
| 8,931,797 B2 * | 1/2015 | Gaerke | B62D 13/04 280/444 |
| 9,179,591 B2 | 11/2015 | Barnett et al. | |
| 9,370,977 B2 * | 6/2016 | Sallis, Sr. | B60D 1/173 |
| 9,840,277 B1 * | 12/2017 | Beech | B60D 1/62 |
| 10,021,823 B2 | 7/2018 | Honey | |
| 10,457,324 B1 * | 10/2019 | Hellbusch | B62D 7/142 |
| 2005/0121878 A1 | 6/2005 | Muldoon | |
| 2008/0086999 A1 * | 4/2008 | Tippery | A01B 73/005 56/228 |
| 2009/0145097 A1 | 6/2009 | Priepke | |
| 2009/0273160 A1 * | 11/2009 | Friggstad | A01B 63/22 280/442 |
| 2011/0100657 A1 * | 5/2011 | Connors | A01B 63/16 172/439 |
| 2012/0217723 A1 * | 8/2012 | Smith | A01B 73/005 280/444 |
| 2014/0151977 A1 * | 6/2014 | Gaerke | B62D 13/04 280/442 |
| 2015/0091274 A1 * | 4/2015 | Bojsen | B60P 3/40 280/442 |
| 2018/0192582 A1 | 7/2018 | Lounder et al. | |
| 2020/0053949 A1 | 2/2020 | Chen et al. | |

FOREIGN PATENT DOCUMENTS

| | | | |
|---|---|---|---|
| DE | 2132135 A1 | 2/1972 | |
| DE | 3205748 A1 | 8/1983 | |
| DE | 34 31 554 A1 | 3/1986 | |
| DE | 10240236 A1 | 3/2004 | |
| EP | 1269825 A1 | 1/2003 | |
| EP | 1905294 A1 | 4/2008 | |
| EP | 3395156 A1 | 10/2018 | |
| EP | 3 669 624 A1 | 6/2020 | |
| EP | 3 669 625 A1 | 6/2020 | |
| FR | 501303 A | 4/1920 | |
| FR | 3008276 A1 * | 1/2015 | ........... A01D 75/002 |
| GB | 1291382 A | 10/1972 | |

OTHER PUBLICATIONS

European Search Report issued in counterpart European Patent Application No. 19191038.9 dated Jan. 30, 2020 (8 pages).
European Search Report issued in European Patent Application No. 19192513.0 dated Jan. 22, 2020 (6 pages).
Unverferth Mfg.—All-Wheel Steer Fieldrunner Header Transport, Nov. 29, 2010, 2 pages, https://www.youtube.com/watch?v=ynmmrAkKsj8.
European Search Report issued in counterpart application No. 20155286.6 dated Jul. 9, 2020 (07 pages).

* cited by examiner

COMBINED GAGE WHEEL AND INTEGRATED TRANSPORT SYSTEM

CROSS-REFERENCE TO RELATED PATENT APPLICATIONS

This application claims the benefit of U.S. Provisional Patent Application No. 62/764,936, filed Aug. 15, 2018, which is incorporated herein by reference in its entirety.

FIELD OF THE DISCLOSURE

The present specification relates generally to the field of agricultural equipment transportation. More particularly, the present specification relates to a transportation and steering system for agricultural equipment.

BACKGROUND

A harvesting machine generally includes a header and a vehicle (e.g., a tractor) for carrying the header. One end of the header is attached to the vehicle. The other end of the header includes ground wheels for supporting the vehicle in movement across the ground. When the header needs to be transported to another location after the harvesting operation, the header may be detached from the vehicle and a trailer is usually used for transporting the header. Other agricultural equipment may also need to be transported from one field to another.

SUMMARY

One implementation of the present disclosure is a steering system for an agricultural machine. The steering system includes a first and second wheel assembly. Each wheel assembly includes an axle assembly including an axle, wheels rotatably connected to the axle, and a double-action hydraulic cylinder. In some embodiments, the double-action hydraulic cylinder is configured to pivot the wheels in either direction to indicate a direction of turn. In some embodiments, the double-action hydraulic cylinder of the first wheel assembly is hydraulically linked in its operation to an operation of the double-action hydraulic cylinder of the second wheel assembly.

In some embodiments, the wheels of each wheel assembly are spaced a distance apart substantially equal to or greater than the width of the agricultural machine.

In some embodiments, the axle assembly includes a tongue connected to the double-action hydraulic cylinder. The tongue is configured to pivot about a pivot point, and is configured to steer the wheels through tie rods connected to the tongue and the wheels, according to some embodiments.

In some embodiments, the double-action hydraulic cylinder is attached on one end to the tongue, and on the other end to the axle.

In some embodiments, the tongue is configured to either be pivoted by an expansion or retraction of the double-action hydraulic cylinder, or to be pivoted by an external force and drive the expansion or retraction of the double-action hydraulic cylinder.

In some embodiments, the double-action hydraulic cylinder of the first wheel assembly is configured to be expanded or retracted by the pivoting of the tongue of the first wheel assembly and is hydraulically linked to the double-action hydraulic cylinder of the second wheel assembly. In some embodiments, the double-action hydraulic cylinder of the second wheel assembly is configured to drive the tongue of the second wheel assembly to control the turn of the wheels of the second wheel assembly.

In some embodiments, the tongue of the first wheel assembly is configured to selectively attach to a vehicle for transportation or to selectively attach to a beam configured to attach to the vehicle for transportation. In some embodiments, the tongue is further configured to be pivoted by a motion of the vehicle.

In some embodiments, the double-action cylinder of the first wheel assembly is configured to hydraulically link to the double-action cylinder of the second wheel assembly by transferring hydraulic fluid from the double-action cylinder of the first wheel assembly to the double-action cylinder of the second wheel assembly to expand or retract the double-action cylinder of the second wheel assembly.

In some embodiments, the wheel assemblies include a spring. The spring is configured to attach at one end to the tongue and at the other end to a protrusion from the axle, and apply a force to an outside wheel of the wheels according to some embodiments. The force is transmitted through the tongue and the tie rods to the outside wheel according to some embodiments. In some embodiments, the outside wheel is the wheel at an outermost distance from a center of a turn.

In some embodiments, the spring connects at one end to a tongue half. In some embodiments, the tongue half is pinned to the tongue.

Another implementation of the present disclosure is a wheel assembly for an agricultural machine. The wheel assembly includes a set of wheels, a header, a double-action cylinder, and a tongue. The header is configured to rotate between a field mode and a transportation mode according to some embodiments. In some embodiments, the double-action cylinder is configured to expand or retract. In some embodiments, the expanding and retracting of the double-action cylinder steers a set of wheels. In some embodiments, the tongue is configured to connect to the double-action cylinder and pivot based on the expansion or retraction of the double-action cylinder.

In some embodiments, the wheel assembly includes an axle. In some embodiments, the double-action cylinder connects at one end to the axle, and at the other end to the tongue.

In some embodiments, the wheel assembly includes a set of tie rods, wherein the tie rods each connect at one end to the tongue and are configured to steer the wheels based on the pivoting of the tongue.

In some embodiments, the tongue is configured to either pivot about a pivot point, drive the expansion and retraction of the double-action cylinder and drive the tie rods to steer the wheels, or to be driven by the expansion and retraction of the double-action cylinder, pivot about the pivot point, and drive the tie rods to steer the wheels based on the expansion and retraction of the double-action cylinder.

In some embodiments, the wheel assembly includes a spring. In some embodiments, the spring is configured to attach at one end to the tongue and at the other end to a protrusion from the axle. In some embodiments, the spring may apply a force to an outside wheel of the wheels. In some embodiments, the force is transmitted through the tongue and the tie rods to the outside wheel. In some embodiments, the outside wheel is the wheel at an outermost distance from a center of a turn.

In some embodiments, the spring connects at one end to a tongue half. In some embodiments, the tongue half is pinned to the tongue.

In some embodiments, the double-action cylinder is configured to hydraulically link to a second double-action cylinder. In some embodiments, the double-action cylinder transfers hydraulic fluid to the second double-action cylinder to expand or retract the second double-action cylinder.

In some embodiments, the wheels are spaced a distance apart greater than or equal to the width of the agricultural machine.

Another implementation of the present disclosure is a method for four-wheel steering on an agricultural machine. The method includes receiving a force input to a tongue. The force input to the tongue indicates a direction and magnitude of a turn of a vehicle and the tongue is configured to pivot in a direction and amount proportional to the direction and magnitude of the turn of the vehicle. The method further includes expanding or retracting a first double-action cylinder based on the direction and amount of pivot of the tongue, expanding or retracting a second double-action cylinder based on the expansion and retraction of the first double-action cylinder, steering a first set of wheels based on the direction and amount of the pivot of the tongue, and steering a second set of wheels based on the expansion and retraction of the second double-action cylinder. In some embodiments, the first double-action cylinder is connected at an end of the tongue.

In some embodiments, the method includes receiving a force input to the tongue through a beam connected to the vehicle.

In some embodiments, the method includes expanding or retracting the second double-action cylinder based on the expansion and retraction of the first double-action cylinder by transferring hydraulic fluid out of a first chamber of the first double-action cylinder into a second chamber of the second double-action cylinder and transferring hydraulic fluid out of a second chamber of the first double-action cylinder into a first chamber of the second double-action cylinder.

In some embodiments, the method includes steering the first set of wheels based on the direction and amount of the pivot of the tongue by driving a set of tie rods with the tongue. In some embodiments, the set of tie rods are connected to the tongue and the first set of wheels.

In some embodiments, the method includes steering the second set of wheels by pivoting a second tongue connected to and pivoted by the second double-action cylinder, and driving a second set of tie rods connected to the second tongue and the second set of wheels.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations.

Referring generally to the FIGURES, the present disclosure provides a steering and transportation system for transporting agricultural harvesting equipment. In some embodiments, the agricultural harvesting equipment is an agricultural harvesting head detached from a combine. In some embodiments, other agricultural equipment may use the steering and transportation system for transportation. In some embodiments, the combine and the agricultural harvesting head are used to harvest crops, process the crops and transport them to storage areas. During harvesting operation, the combine pushes the agricultural harvesting head which travels along the ground, supported on one end by the combine, and supported on the ground by wheels (also referred to as gage wheels), according to some embodiments. In some embodiments, the agricultural harvesting head may sever the crop and transfer it into the combine for processing and storage. In some embodiments, the harvesting head includes a pair of similar wheel assemblies near both ends of the harvesting head. When the harvesting head must be transported (e.g., on roads from one field to another), the wheel assemblies rotate 90 degrees and lock in position, according to some embodiments. The harvesting head may then be attached to a vehicle for transportation. In some embodiments, each of the wheel assemblies includes a double-acting hydraulic cylinder configured to turn the wheels by moving tie rods each connected to the hub assembly of the wheel they are configured to steer. In some embodiments, the double-acting hydraulic cylinder of each wheel assembly are hydraulically connected to each other, such that both pairs of wheels can operate to aid turning, providing a four-wheel steering system. The four wheel steering system may aid in sharp turns both during the harvesting operation as well as during transportation of the agricultural harvesting head. Additionally, in some embodiments the distance between the wheels is the same for both wheel assemblies. This may provide better support during sharp turns, and prevents rollover or tipping from occurring in some embodiments.

Sometimes when the user operating the combine makes a sharp turn (to turn around after completing one pass through the crop field, or to avoid objects or trees), the harvesting head wheels skid (i.e., the frictional interface between the point of the wheel contacting the ground becomes a dynamic frictional interface rather than a static frictional interface which is present when the wheel rolls). This may damage the wheels or any part of the axle assembly by introducing transverse thrust loads or other loads into the axle assembly and the wheels. In some cases, skidding may cause an undesirable load to be introduced into the agricultural harvesting head. Skidding may also cause ruts in the soil and dirt clumping. Therefore, a harvesting head which has wheels configured so that they do not skid when undergoing sharp turns is advantageous since it reduces the above mentioned problems associated with skidding wheels. In some embodiments, a force is applied to an outside wheel by a centering bar. This force implements a rollover feature which prevents the wheels from skidding and reduces the problems associated with skidding wheels described hereinabove. Additionally, this force causes the wheels to return back to a forward direction of travel after a turn.

Figure 1:
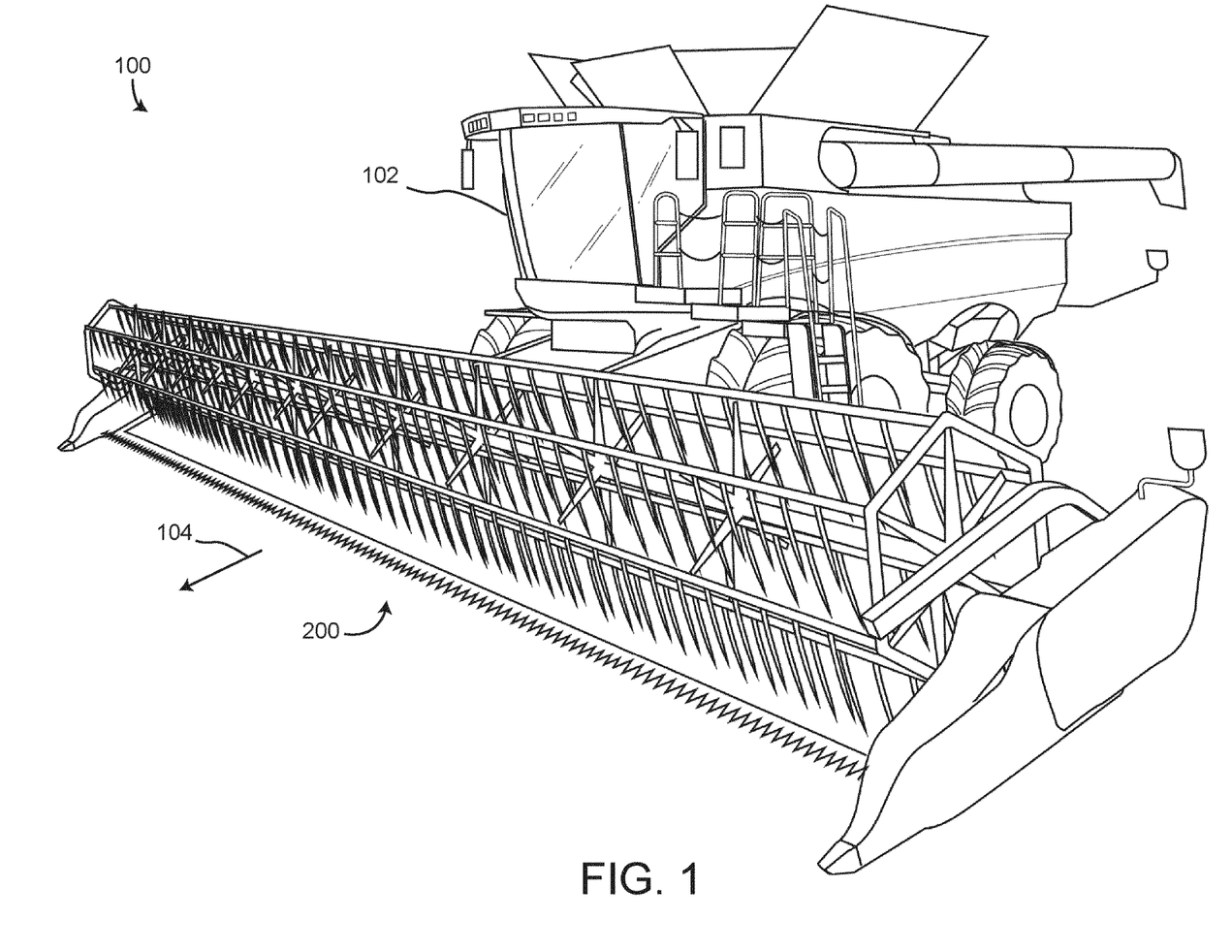
FIG. 1 is a perspective view schematic drawing of an agricultural harvester, including an agricultural harvesting head assembly, according to some embodiments.

Referring now to FIG. 1, an agricultural harvesting machine 100 is shown according to some embodiments. The agricultural harvesting machine 100 includes a combine 102 and a harvesting head assembly 200 according to some embodiments. The harvesting head assembly 200 is supported on one end by the combine 102, and supported above the ground by wheels 224 (see FIGS. 2A-4) according to some embodiments. As the agricultural harvesting machine 100 moves in harvesting direction of travel 104, the harvesting head assembly 200 severs the crop, and transports it to combine 102 for processing and storage according to some embodiments. In some embodiments, harvesting head assembly 200 is detachably connected to combine 102. It should be noted that the present disclosure references a harvesting head assembly 200 to be transported, however, any other agricultural machine that requires transportation may use the steering/transportation-system described, and while the steering/transportation system may be used to transport harvesting head assembly 200 the use of harvesting head assembly 200 is only one possible application of the steering/transportation system.

Figure 2A:
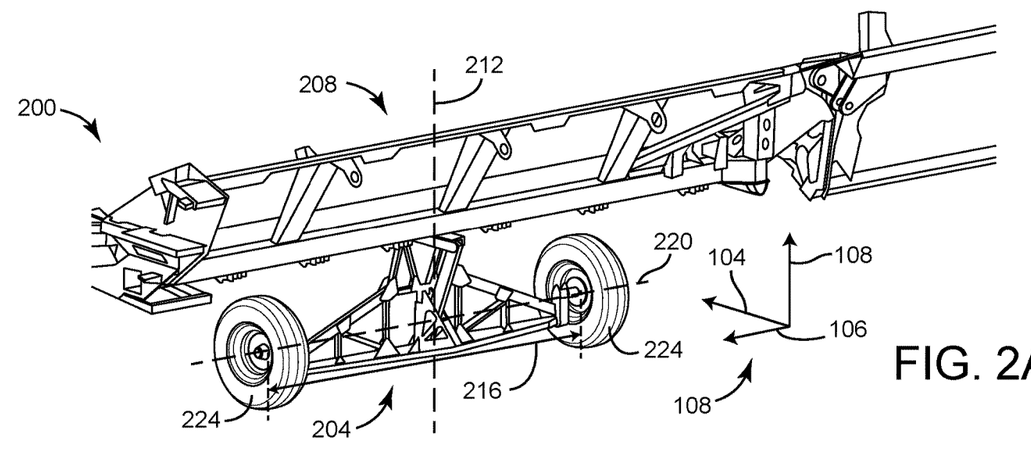
FIGS. 2A-B are perspective view schematic drawings of the agricultural harvesting head assembly of FIG. 1 showing an axle and wheel assembly in a field mode and a transportation mode, according to some embodiments.
Figure 2B:
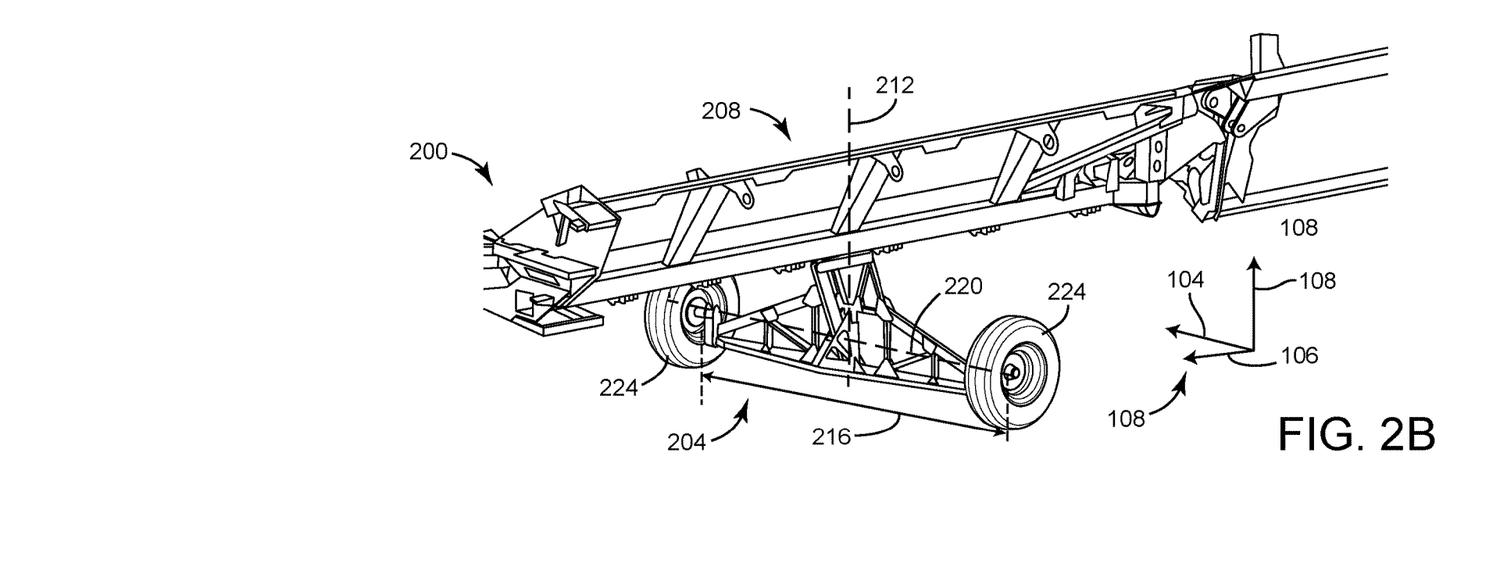

Referring now to FIGS. 2A-B, the agricultural harvesting head assembly 200 is shown, detached from combine 102. The agricultural harvesting head assembly 200 is shown to include wheel assembly 208 according to some embodiments. FIGS. 2A-B show only one wheel assembly 208, however the wheel assembly 208 on the opposite end of agricultural harvesting head assembly 200 may be symmetrical, so that whatever is said of the wheel assembly 208 shown in FIGS. 2A-B may also be said of the wheel assembly 208 connected at the opposite end of the harvesting head assembly 200, according to some embodiments. FIGS. 2A-B also show coordinate system 108 for illustrative and explanatory purposes, having three axes (104, 106, and 108) which may indicate direction of motion or direction in space. The three axes 104, 106, and 108 are orthogonal to each other.

FIG. 2A shows wheel assembly 208 connected to the agricultural harvesting head assembly 200 in a harvesting mode of operation according to some embodiments. Wheel assembly 208 is shown to include wheels 224 and axle assembly 204 according to some embodiments. Wheels 224 rotatably connect to the axle assembly 204 and the axle assembly 204 connects to the agricultural harvesting head assembly 200 according to some embodiments. In the harvesting mode of operation (shown in FIG. 2A), a centerline 220 which extends through the centers of wheels 224 is generally perpendicular to the harvesting direction of travel 104 and generally parallel to a longitudinal direction 106 of harvesting head assembly 200, according to some embodiments. Wheels 224 are therefore configured to support the harvesting head assembly 200 and roll in the harvesting direction of travel 104 according to some embodiments. When the harvesting head assembly 200 must be transported, wheel assemblies 208 are configured to rotate 90 degrees as shown in FIG. 2B so that they generally point in longitudinal direction 106 according to some embodiments.

In some embodiments, wheel assemblies 208 rotate 90 degrees about centerline 212. Centerline 212 may extend generally through the center of axle assembly 204 and may be generally parallel to axis 108 according to some embodiments. In some embodiments, centerline 212 is half way in between the wheels 224. When the wheel assemblies 208 have both rotated 90 degrees, the harvesting head assembly 200 may be transported in direction 106 (if the wheel assembly 208 shown is the front wheel assembly 208), or in the opposite direction (if the wheel assembly 208 shown is the rear wheel assembly 208), according to some embodiments. Harvesting head assembly 200 as shown in FIG. 2B may be attached to a vehicle and may be transported on roads according to some embodiments. In some embodiments, harvesting head assembly 200 may be loaded into a trailer. In some embodiments, when harvesting head assembly 200 is loaded into the trailer, the wheel assemblies 208 are completely removed. In some embodiments, the wheel assemblies 208 are retracted for trailer transportation such that the wheel assemblies 208 do not interfere with the trailer during transportation.

FIGS. 2A-B also show the wheels 224 spaced a distance 216 apart according to some embodiments. Both front and rear wheel assemblies 208 may have wheels 224 spaced distance 216 apart, according to some embodiments. In some embodiments, the wheel assemblies 208 may have wheels 224 spaced apart at different distances. For example, the wheel assembly 208 shown in FIGS. 2A-B may have wheels 224 spaced distance 216, while the wheel assembly 208 at the opposite end of harvesting head assembly 200 may have wheels 224 spaced a distance greater than distance 216 according to some embodiments. In some embodiments, wheel assembly 208 at the opposite end of harvesting head 200 may have wheels 224 spaced a distance less than distance 216. In some embodiments, the wheel assembly 208 with the wheels 224 spaced a greater distance apart than the opposite wheel assembly 208 may be the "front" of the harvesting head assembly 200 during transportation. In some embodiments, the wheel assembly 208 with the wheels 224 spaced a lesser distance apart than the opposite wheel assembly 208 may be the "front" of the harvesting head assembly 200 during transportation. In some embodiments, the distance between wheels 224 is the same for both wheel assemblies 208 and either wheel assembly 208 may be the "front" or "rear" of the harvesting head assembly 200 during transportation. In some embodiments, the distance between wheels 224 is the same for both wheel assemblies 208 and one of the wheel assemblies 208 may be the "front" while the other wheel assembly 208 may be the "rear."

Referring still to FIGS. 2A-2B, the wheels 224 are shown spaced distance 216 apart. In some embodiments, distance 216 is substantially greater than the width of the harvesting head assembly 200 in direction 104. In some embodiments, distance 216 is substantially equal to the width of harvesting head assembly 200 in direction 104. This provides a stable support for the harvesting head assembly 200 during transportation, according to some embodiments. When the harvesting head assembly 200 is transported and goes around a sharp turn, inertial forces may cause the harvesting head assembly 200 to tip. For example, if the wheel assembly 208 shown in FIGS. 2A-B is the "front" wheel assembly, and the user makes a left turn, there may be a component of an inertial force from the center of gravity of the harvesting head assembly 200 in the 104 direction. This force in the 104 direction may produce a moment about the 106 axis. Advantageously, the wide wheel distance 216 provides a countermoment according to some embodiments. In the case of a left turn, the left wheel of the wheel assembly 208 (the right wheel from the vehicle operator's perspective) may provide a reactionary moment to counter the tipping moment. The moment arm of the reactionary moment may be up to half of the distance 216 (i.e., the distance from the center of the left wheel 224 to the center of the axle assembly 204 in the 104 direction). The rear wheel assembly 208 may also provide a counter-moment to the tipping moment, according to some embodiments. In some embodiments, both the front wheel assembly 208 and the rear wheel assembly 208 may provide a counter-moment to the tipping moment. The distance 216 provides a longer moment arm to counter the tipping moment which may occur during sharp turns or if the vehicle operator makes a turn at a high speed, since making a turn at a high speed produces a large inertial force which may cause a tipping moment. Both the front and the rear wheel assemblies 208 may have equal distances 216 and distance 216 may be substantially equal to or greater than the width of the agricultural machine in the 104 direction. Advantageously, this reduces the tendency of the agricultural machine (e.g., harvesting head assembly 200 as shown in FIGS. 1-2B) to tip during turns. Tipping may cause uneven distribution or excessive magnitude of loads to the axle assemblies 204 and the wheel assemblies 208 which may damage components in the axle assembly 204 or wheel assemblies 208 which may not be designed to undergo these excessive loads. Additionally, if the agricultural machine tips over completely (i.e., rollover), this may cause severe damage to the agricultural machine, which may be expensive and time-consuming to repair. While the agricultural machine is being repaired, it cannot be used for agricultural purposes, and this can cause additional costs. Reducing the tendency of the agricultural machine to tip while making turns during transportation reduces the likelihood of the agricultural machine rolling over, and enables the vehicle operator to make sharper turns without fear of tipping the agricultural machine. This also enables the vehicle operator greater mobility during transportation, and enables the vehicle operator to take routes which may require sharp turns. Embodiments in the present disclosure provide a solution to this problem by providing a wide wheel base which reduces the likelihood and magnitude of tipping and may reduce the likelihood of rollover occurring.

Figure 3:
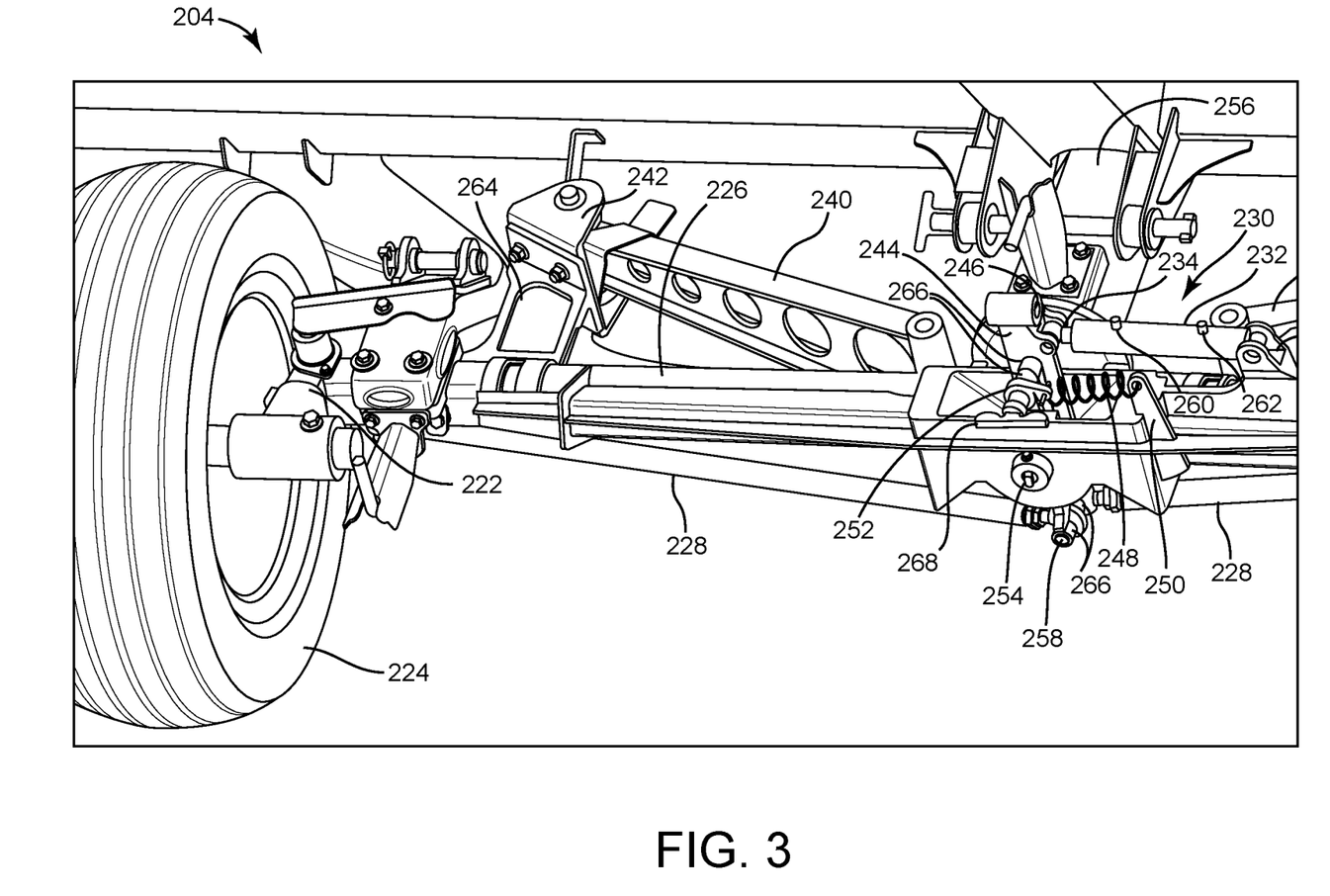
FIG. 3 is a bottom perspective view schematic drawing of the axle assembly of FIG. 1, according to some embodiments.
Figure 4:
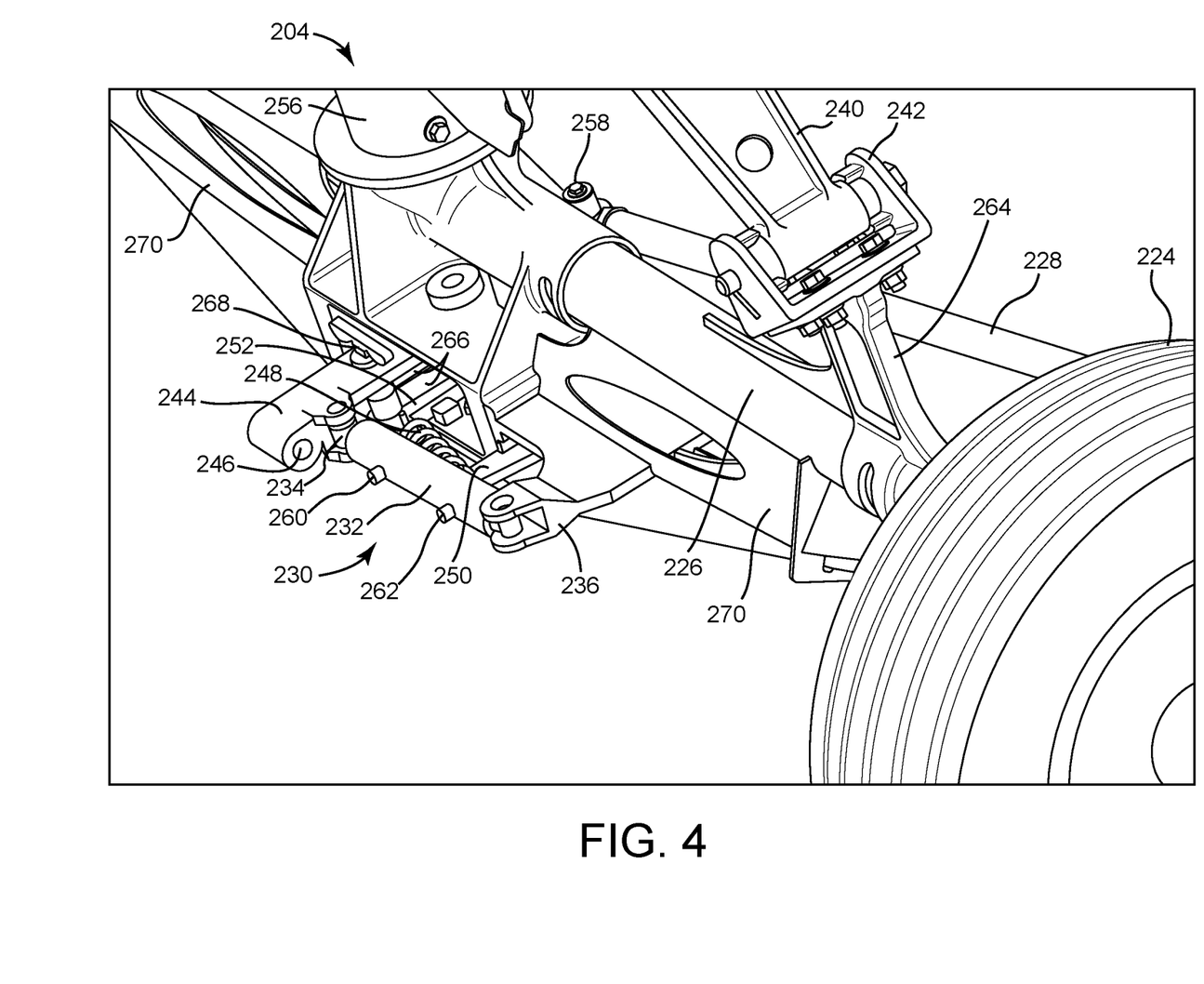
FIG. 4 is a top perspective view schematic drawing of the axle assembly of FIG. 1, according to some embodiments.

Referring now to FIGS. 3-4, the axle assembly 204 of the wheel assembly 208 is shown in greater detail according to some embodiments. In FIGS. 3-4, only one axle assembly 204 is shown, however it should be understood that everything said of the axle assembly 204 shown in FIGS. 3-4 may be said of the axle assembly 204 at the opposing end of harvesting head assembly 200 or more generally the agricultural machine. Axle assembly 204 is shown to include horizontal axle 226, header 256, tongue 244, double-action cylinder 230, struts 240, cylinder mount 236, tie rods 228, centering bar 252, and spring 248 according to some embodiments. Double-action cylinder 230 may be generally horizontally oriented, and may be generally parallel to horizontal axle 226.

In some embodiments, double-action hydraulic cylinder 230 has outer tubular member 232 (e.g., a barrel) which pivotally connects to cylinder mount 236 and inner tubular member 234 (e.g., a rod) which pivotally connects to tongue 244. Cylinder mount 236 may be fixedly connected to horizontal axle 226 or may be intergrally formed with horizontal axle 226, according to some embodiments. Tongue 244 is configured to pivot about pin joint 254 according to some embodiments. Tongue 244 pivotally connects to tie rods 228 at joint 258 according to some embodiments. According to some embodiments, as double-action cylinder 230 expands or retracts, tongue 244 pivots about pin joint 254. For example, when double-action cylinder 230 expands, the end of tongue 244 which pivotally connects to the inner tubular member 234 moves to the left, according to some embodiments. As the end of tongue 244 which pivotally connects to inner tubular member 234 moves to the left due to the expansion of double-action cylinder 230, tongue 244 pivots about pin joint 254, resulting in the end of tongue 244 which pivotally connects to tie rods 228 moving to the right, according to some embodiments. The pivoting of the tongue 244 may cause the tie rods 228 to move to the right, thus steering the wheels 224, according to some embodiments. Likewise, as the end of tongue 244 which pivotally connects to inner tubular member 234 moves to the right due to the retraction of double-action cylinder 230, tongue 244 pivots about pin joint 254, resulting in the end of tongue 244 which pivotally connects to tie rods 228 moving to the left, according to some embodiments. In some embodiments, the tongue 244 is driven to pivot by the vehicle or another external force applied to the tongue, and the pivoting motion of the tongue 244 drives the expansion or retraction of double-action cylinder 230 in the same configuration as discussed above.

Double-action cylinder 230 is shown to include inlet/outlet ports 260 and 262 according to some embodiments. In some embodiments, inlet/outlet ports 260 and 262 are configured to allow the flow of hydraulic fluid into or out of two chambers of double-action cylinder 230. In some embodiments, the flow of hydraulic fluid in and out of inlet/outlet ports 260 and 262 is driven by the pivoting motion of tongue 244 which may be driven by the vehicle. In some embodiments, the flow of hydraulic fluid in and out of inlet/outlet ports 260 and 262 causes the double-action cylinder 230 to expand or retract and drives the pivoting of the tongue 244. In some embodiments, inlet/outlet ports 260 and 262 are configured to allow hydraulic fluid to flow between the front and rear double-action cylinders 230. In some embodiments, inlet/outlet ports 260 and 262 are configured to allow the hydraulic fluid to flow between either one or both the front and rear double-action cylinders 230 and a hydraulic fluid reservoir or a pump. Inlet/outlet ports 260 and 262 may each allow the inflow or outflow of hydraulic fluid according to some embodiments.

In some embodiments, the inlet/outlet ports 260 and 262 are configured to interface with hydraulic lines to facilitate the flow of hydraulic fluid into and out of the double-action cylinder 230. For example, the front double-action cylinder 230 may be configured to be driven into a more retracted state by the tongue 244, thus expelling hydraulic fluid from one chamber of the front double-action cylinder 230 according to some embodiments. The hydraulic fluid expelled from one chamber of the front double-action cylinder 230 may be directly introduced to a chamber of the rear double-action cylinder 230 causing the rear double-action cylinder 230 to expand. In some embodiments, the front double-action cylinder 230 may be driven into a more expanded state by the tongue 244, causing hydraulic fluid to be introduced into one chamber of the front double-action cylinder 230. According to some embodiments, the hydraulic fluid introduced into one chamber of the front double-action cylinder 230 may be drawn directly from the chamber of the rear double-action cylinder 230, causing the rear double-action cylinder 230 to be driven into a more retracted state. The flow of the hydraulic fluid between the front and rear double-action cylinders 230 may be facilitated by the inlet/outlet ports 260 and 262 of the double-action cylinders 230, as well as hydraulic lines connecting the inlet/outlet ports 260 and 262 of the front and rear double-action cylinders 230.

Double-action cylinders 230 may include a piston attached to inner tubular member 234, configured to sealingly interface with an inner diameter of outer tubular member 232 according to some embodiments. In some embodiments, a seal may be used to sealingly interface an outer diameter of the piston to the inner diameter of the outer tubular member 232. The seal may be an O-ring made of rubber, or any other seal which prevents the flow of fluid between the interface of the seal and the inner diameter of outer tubular member 232. Inner tubular member 234 and the piston attached to it may longitudinally travel within the outer tubular member 232 according to some embodiments. In some embodiments, the end of outer tubular member 232 which inner tubular member 234 protrudes from is sealed, such that inner tubular member 234 can expand and retract (i.e., travel longitudinally within outer tubular member 232), without hydraulic fluid leaking from the end which inner tubular member 234 protrudes. In some embodiments, the seal interface between the piston attached to the inner tubular member 234 and the outer tubular member 232 divides the double-action cylinder 230 into two chambers.

The first chamber may be defined between the end of the outer tubular member 232 which the inner tubular member 234 protrudes from, the inner walls of the outer tubular member 232, and the sealed interface between the piston attached to the inner tubular member 234 and the inner diameter of the outer tubular member 232, according to some embodiments. The second chamber may be defined between an end of the outer tubular member 232 opposite the end which the inner tubular member 234 protrudes from, the inner walls of the outer tubular member 232, and the sealed interface between the piston attached to the inner tubular member 234 and the inner diameter of the outer tubular member 232, according to some embodiments. In some embodiments, as hydraulic fluid flows into the second chamber of double-action cylinder 230, hydraulic fluid leaves the first chamber of double-action cylinder 230, and the double-action cylinder 230 expands. In some embodiments, as hydraulic fluid flows into the first chamber of double-action cylinder 230, hydraulic fluid leaves the second chamber of double-action cylinder 230, and the double-action cylinder 230 retracts. The inlet/outlet port 260 may be the inlet/outlet port for the first chamber, and the inlet/outlet port 262 may be the inlet/outlet port 262 for the second chamber, according to some embodiments.

In some embodiments, the front and rear double-action cylinders 230 may be hydraulically linked, such that when hydraulic fluid leaves the first chamber and enters the second chamber of the front double-action cylinder 230 (i.e., the front double-action cylinder 230 expands), hydraulic fluid enters the first chamber and leaves the second chamber of the rear double-action cylinder 230 (i.e., the rear double-action cylinder 230 retracts). In some embodiments, the front and rear double-action cylinders 230 may be hydraulically linked, such that when hydraulic fluid leaves the second chamber and enters the first chamber of the front double-action cylinder 230 (i.e., the front double-action cylinder 230 retracts), hydraulic fluid enters the second chamber and leaves the first chamber of the rear double-action cylinder 230 (i.e., the rear double-action cylinder expands). In some embodiments, the first chamber of the front double-action cylinder 230 is hydraulically linked to the second chamber of the rear double-action cylinder 230 and the second chamber of the front double-action cylinder 230 is hydraulically linked to the first chamber of the rear double-action cylinder 230.

As stated above, the flow of fluid between the first chamber of the front double-action cylinder 230 and the second chamber of the rear double-action cylinder 230, and the flow of fluid between the second chamber of the front double-action cylinder 230 and the first chamber of the rear double-action cylinder 230 may be facilitated by the inlet/outlet ports 260 and 262 and hydraulic lines, according to some embodiments. For example, a first hydraulic line may be attached to the inlet/outlet port 260 of the front double-action cylinder 230 and the inlet/outlet port 262 of the rear double-action cylinder 230, while a second hydraulic line may be attached to the inlet/outlet port 262 of the front double-action cylinder 230 and the inlet/outlet port 260 of the rear-double action cylinder 230, according to some embodiments. This may produce a closed fluid circuit between the inlet/outlet ports 260 and 262 of the front and rear double-action cylinders 230, with the front double-action cylinder 230 being driven (i.e., expanded or retracted) by the tongue 244 driven by the motion of the vehicle, and the rear double-action cylinder 230 being driven (i.e., expanded or retracted) due to the hydraulic fluid transferred to or from the first or second chambers of the front double-action hydraulic cylinder 230, according to some embodiments.

Tongue 244 may be produced from steel, and may be generally square-shaped in its cross section, according to some embodiments. In some embodiments, the cross-sectional shape of tongue 244 may be generally I-shaped, generally rectangular, etc., or any other shape. According to some embodiments, tongue 244 may include connecting portion 246 integrally formed with tongue 244 near its end. Connecting portion 246 may include a through-hole and may be configured to attach to a beam for towing or transportation purposes in some embodiments. In some embodiments, the beam may connect to a trailer hitch on the vehicle, and the other end of the beam may connect to the connecting portion 246 with a removable pin. The beam may act as a tensile load-carrying member, transferring a towing force from the vehicle to the tongue 244 to tow the agricultural machine according to some embodiments. In some embodiments, when the vehicle turns, the tongue 244 (in the front axle assembly 204) is caused to pivot by the turning motion of the vehicle, transferred through the beam. This may cause tongue 244 to drive the expansion/retraction of the front double-action cylinder 230. In some embodiments, tongue 244 is connected to tongue halves 266. Tongue halves 266 may be pinned to tongue 244 with removable pin 268. In some embodiments, tongue halves 266 are integrally formed with tongue 244. Tongue halves 266 may be positioned between centering bar 252 and tongue 244 according to some embodiments. In some embodiments, centering bar 252, tongue halves 266, and tongue 244 are all pinned with pin 268. In some embodiments, tongue halves 266 are integrally formed with centering bar 252. Tongue halves 266 may extend substantially the entire length of tongue 244 according to some embodiments. Tongue halves 266 may be made from steel and may have a generally square or generally rectangular cross-sectional shape. In some embodiments, tongue halves 266 are integrally formed with tongue 244.

Tie rods 228 are configured to steer wheels 224 to determine a turn direction according to some embodiments. Therefore, the expansion and retraction of double-action cylinder 230 may determine the turn direction, according to some embodiments. In some embodiments, tie rods 228 are generally circular in their cross-sectional shape. In some embodiments, the cross-sectional shape of tie rods 228 may be generally oval, generally square, generally rectangular, or any other shape. Tie rods 228 may be substantially the same length, according to some embodiments. Tie rods 228 may have eye portions near their ends configured to connect to the joint 258 on one end and to connect to wheel hub 222 on the other end.

Referring still to FIGS. 3-4, axle assembly 204 is shown to include struts 240. Struts 240 may be made of steel and may have cross-sectional shape that is I-shaped according to some embodiments. In some embodiments, struts 240 may have a cross-sectional shape that is generally rectangular, generally circular, etc. According to some embodiments, struts 240 may have through-holes distributed along the longitudinal length, which may decrease the weight and material of the struts 240. In some embodiments, struts 240 are configured to connect on one end to strut mounts 242 and connect on their other end to header 256. Struts 240 may be removable according to some embodiments. In some embodiments, struts 240 connect to strut mounts 242, which connects to strut connector 264. Strut connector 264 connects the strut mounts 242 to horizontal axle 226, according to some embodiments. According to some embodiments, the connection between the strut connector 264 and the horizontal axle 226 is a fixed connection. Horizontal axle 226 may have axle reinforcement 270 which provides additional strength to horizontal axle 226 according to some embodiments. In some embodiments, the horizontal axle 226 may be generally circular.

In some embodiments, the double-action cylinder 230 of the two axle assemblies 204 are hydraulically connected. Since both axle assemblies 204 have the same general configuration, both axle assemblies 204 are configured to turn wheels 224, resulting in a four-wheel steering system. Double-action cylinders 230 are configured to hydraulically connect to each other to produce a turning radius smaller than if only one of the wheel assemblies 208 were steerable. According to some embodiments, the expansion and retraction amounts of the double-action cylinders 230 are equal. For example, when double-action cylinder 230 shown in FIG. 3 expands 1 cm, the other double-action cylinder 230 may be configured to expand 1 cm as well according to some embodiments. In some embodiments, the expansion and retraction of the double-action cylinders 230 are not equal. For example, when double-action cylinder 230 shown in FIG. 3 expands 1 cm, the other double-action cylinder 230 (not shown) may be configured to expand 0.5 cm according to some embodiments. According to some embodiments, the expansion and retraction of the double-action cylinders 230 are inversely proportional. For example, when double-action cylinder 230 shown in FIG. 3 expands 1 cm, the other double-action cylinder 230 may be configured to retract 1 cm (or 0.5 cm, or 1.5 cm, etc.) according to some embodiments. In some embodiments, the length of the tongue 244 is not equal between the two axle assemblies 204. Therefore, the same amount of expansion or retraction of the double-action cylinders 230 may not correspond to equal angular pivot displacements of the tongue 244 according to some embodiments. In some embodiments, the relationship between the angular displacement of the front wheels 224 and the rear wheels 224 due to the expansion or retraction of double-action cylinder 230 is linear (e.g., when the front wheels rotate 30 degrees, the rear wheels rotate 30 degrees in a direction to produce the same turn as the front wheels). In some embodiments, the relationship between the angular displacement of the front wheels 224 and the rear wheels 224 due to the expansion or retraction of the double-action cylinder 230 is inversely linear (e.g., when the front wheels rotate 30 degrees, the rear wheels rotate −30 degrees). In some embodiments, the relationship between the angular displacement of the front wheels 224 and the rear wheels 224 due to the expansion or retraction of the double-action cylinder 230 may be non-linear (e.g., when the front wheels rotate 30 degrees, the rear wheels rotate 15 degrees, when the front wheels rotate 60 degrees, the rear wheels rotate 30 degrees, when the front wheels rotate 70 degrees the rear wheels rotate 35 degrees, etc.). Some or any of these relationships between the rotation of the front wheels 224 and the rear wheels 224 due to the expansion and retraction of the double-action cylinders 230, may be obtained by using different lengths of the tongue 244, the outer tubular member 232, or the inner tubular member 234.

In some embodiments, the tongue 244 drives the double-action cylinder 230. For example, if the tongue 244 is connected to a vehicle and the vehicle makes a turn, this will cause the tongue 244 to move and to actuate double-action cylinder 230. In some embodiments, the double-action cylinder 230 which is driven by the tongue 244 only occurs on the front axle assembly 204. The rear axle assembly 204 may include double-action cylinder 230 that is hydraulically linked to the operation of the double-action cylinder 230 of the front axle assembly 204 according to some embodiments. The tongue is configured to pivot due to the direction of turn of the vehicle, and to expand or contract the front double-action cylinder 230 based on the movement of the tongue 244, according to some embodiments. In some embodiments, the tongue 244 pivots in direction and magnitude proportional to the turn of the vehicle. For example, if the vehicle makes a sharp right turn, tongue 244 may pivot +35 degrees, according to some embodiments. In some embodiments, if the vehicle makes a slight left turn, tongue 244 may pivot −15 degrees. In some embodiments, the direction and magnitude of the pivoting of the tongue 244, which is proportional to the magnitude and direction of turn of the vehicle, may cause the front double-action cylinder 230 to expand or retract (direction) a certain length (magnitude). According to some embodiments, the rear double-action cylinder 230 is hydraulically linked to the front double-action cylinder 230 and expands or retracts based on the operation of the front double-action hydraulic cylinder 230 (i.e., the rear double-action cylinder 230 expands or retracts due to the fluid transfer from the front double-action cylinder 230). In this way, the direction and magnitude of the turn of the vehicle is transferred to the front double-action cylinder 230 through the tongue 244, and to the rear double-action cylinder 230, resulting in four-wheel steering according to some embodiments. According to some embodiments, the relationship between the operation of the front double-action cylinder 230 (as driven by the tongue 244) and the rear double-action cylinder 230 is any of the relationships discussed above (e.g., linear, non-linear, based on expansion or retraction length, based on turn angle of wheels, etc.). For example, in some embodiments, when the vehicle makes a sharp right turn, the tongue 244 may pivot +35 degrees, causing the front double-action cylinder 230 to expand a length of 3 cm, while the rear double-action cylinder 230 may retract only 1.5 cm.

In some embodiments, the double-action cylinders 230 are hydraulically connected in their operation to each other through a hydraulic fluid circuit. In some embodiments, the relationship between the expansion and retraction of the front and rear double-action cylinders 230 may be related to fluid quantity. For example, as 10 mL of hydraulic fluid leaves or enters the front double-action cylinder 230 as it retracts or expands, 10 mL of hydraulic fluid may leave or enter the rear double-action cylinder 230 causing it to expand or retract and vice versa. In some embodiments, the relationship between the fluid entering or leaving the front double-action cylinder 230 and the fluid entering or leaving the rear double-action cylinder 230 is non-linear. In some embodiments, a controller may be present in the hydraulic fluid circuit, configured to control the operation of a pump. The controller may be configured to control the pump to pump fluid between a fluid reservoir and the front and/or rear double-action cylinders 230. The controller may pump fluid between the front and/or rear double-action cylinders 230 based on the operation of the front or rear double-action cylinders 230 which may be determined by the pivoting of the tongue 244 which is directly related to the magnitude and turn of the vehicle. In some embodiments, the controller may receive information from a wheel speed sensor or a magnitude of turn sensor and adjust the operation of the pump (or the relationship between the rotation of the front and rear wheels 224) based on information received from the wheel speed sensor or the magnitude of turn sensor. For example, the controller may be configured to control the pump to expand or retract the rear double-action cylinder 230 only during sharp turns when four-wheel steering is necessary.

Due to the similar configurations of the front and rear wheel assemblies 208, both wheel assemblies 208 can steer due to the double-action cylinder 230, according to some embodiments. In some embodiments, this results in four-wheel steering. Four-wheel steering provides many advantages. For example, when the agricultural harvesting head 200 (or any other agricultural machine) is being transported behind a vehicle, the driver may need to make sharp turns in order to avoid obstacles in the road or to even simply make a sharp turn around a corner. Agricultural machines that are being transported behind vehicles can often be very long (typically much longer than the average length of a truck), and this can make transporting the agricultural machines very difficult. If the vehicle operator cannot make a sharp turn on a route, it may limit the route that the operator can take, and this can add additional cost and time to transporting the agricultural machine. If the operator decides to take a route with a sharp turn or must make a sharp turn to avoid something in the road, the rear wheels may skid if a two-wheel steering system is used. The desired turn may be too sharp for the two-wheel steering system, and this may cause the rear wheels to drag along the ground. This is undesirable since it may wear out the tires, and may introduce transverse loads into the axle which may damage the axle, the wheel bearings, or any other part of the axle assembly. In some embodiments, if the desired turn is too sharp for the two-wheel steering system (e.g., a turn exceeds turning limits of the two-wheel steering system), tongue 244 may receive an excessive bending force and if the bending force becomes too great, tongue 244 may bend (e.g., deform). Wheel dragging/scrubbing may also occur during harvesting or while using the agricultural machine in field mode if the operator makes a turn which is too sharp. This can cause the same problems as when a sharp turn is made on the road (transverse loads, wearing of tires, etc.), and additionally may produce ruts in the soil or forcibly introduce dirt into the axle system. Using a four-wheel steering system as described above may solve these problems. The four-wheel steering system enables the vehicle driver to make sharp turns while during transportation, and also enables the agricultural machine operator to make sharp turns when using the agricultural machine in a field. Additionally, the four-wheel steering may decrease the likelihood of tipping at high speeds. This may enable the vehicle operator to travel faster during transportation without risk of rolling over and damaging the agricultural machine. Advantageously, this may reduce in the transportation time, enabling faster transportation.

Referring still to FIGS. 3-4, the axle assembly 204 is shown to include spring 248, which is connected on one end to spring mount 250, and connected to centering bar 252 on the other end, according to some embodiments. In some embodiments, centering bar 252 is pinned to tongue 244. Spring 248 may in some embodiments provide a centering force for the rollover function while in field mode. In some embodiments, spring 248 is configured to provide a force to the outside wheel 224 (the only wheel shown in FIG. 3) during a turn. For example, when the spring 248 is expanded due to the expansion of double-action cylinder 230, it produces a tensile force between the centering bar 252 and the spring mount 250. This force is transmitted through centering bar 252, tongue 244, and the left tie rod 228 of FIG. 3 to the left (outside) wheel 224 of FIG. 3 according to some embodiments.

In some embodiments, the front double-action cylinder 230 is connected to the tongue 244 which pivots about pin joint 254. The tongue 244 may be driven by the vehicle through the beam connected to connecting portion 246 according to some embodiments. As the vehicle makes a turn, the tongue 244 is caused to pivot, and the front double-action cylinder 230 expands or retracts according to some embodiments. The tongue 244 is also connected to the tie rods 228, and the pivoting of the tongue 244 causes the tie rods 228 to move and steer the wheels 224, according to some embodiments. As the front double-action cylinder 230 expands or retracts, hydraulic fluid enters or leaves the first or second chamber of the front double-action cylinder 230, through inlet/outlet ports 260 and 262 according to some embodiments. Hydraulic fluid is transferred to or from the front double-action cylinder 230 and the rear-double action cylinder 230 through hydraulic fluid lines connected to the inlet/outlet ports 260 and 262 of the front and rear double-action cylinders 230 according to some embodiments. When hydraulic fluid is transferred to and from the front double-action cylinder 230 and the rear double-action cylinder 230, rear double-action cylinder 230 expands or retracts due to the transfer of hydraulic fluid into and out of the first and second chambers (or the second and first chambers) of double-action cylinder 230 respectively, according to some embodiments. The expansion or retraction of rear double-action cylinder 230 causes the tongue 244 of the rear wheel assembly 208 to pivot, according to some embodiments. When the tongue 244 of the rear wheel assembly 208 pivots due to the expansion or retraction of rear double-action cylinder 230, the tongue 244 of the rear wheel assembly 208 drives the tie rods 228 of the rear wheel assembly 208, according to some embodiments. The tie rods 228 of the rear wheel assembly 208 are connected to the wheels 224 of the rear wheel assembly 208, according to some embodiments. As the tie rods 228 of the rear wheel assembly 208 are driven by the tongue 244 of the rear wheel assembly 208, the tie rods 228 of the rear wheel assembly 208 steer the wheels 224 of the rear wheel assembly 208, according to some embodiments. Therefore, as the front wheel assembly 208 is steered to make a turn, the rear wheel assembly 208 is also steered in a direction conducive to the turn of the vehicle, according to some embodiments.

Another advantage of the present invention is that both the wheel assemblies 208 may be symmetrical, according to some embodiments. Therefore, when parts are manufactured or must be replaced, the same parts can be used for both wheel assemblies 208. Often times, agricultural machines that have wheels for transporting will use different configurations for the front and rear wheel assemblies and unique parts must be manufactured for both of these wheel assemblies. The present invention presents a standardized wheel assembly 208 that may be used on the front and rear, and may reduce tipping and implement four-wheel steering, according to some embodiments.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Although the present disclosure is illustrated by the example of a header of a harvest machine, the present disclosure may be applied to various machines that are similar to the header of a harvest machine that need to be transported between different field sites.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "first" and "second" in connection with side and end, etc., for purposes of identifying or differentiating one from another or from others. These terms are not intended to merely relate entities (e.g., a first side and a second side) temporally or according to a sequence, although in some cases, these entities can include such a relationship. Nor do these terms limit the number of possible entities (e.g., sides or ends) that can operate within a system or environment.

The terms "connected" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

What is claimed is:

1. A harvesting head assembly for an agricultural machine, the harvesting head assembly comprising:
a pair of wheel assemblies configured to rotate between a field mode and a transportation mode relative to a header of the harvesting head assembly, each of the wheel assemblies comprising:
a set of wheels, an axle, a tongue, and a set of tie rods;
a double-action cylinder connected at one end to the axle and at an opposite end to a first end of the tongue, the double-action cylinder configured to expand or retract, wherein the expanding and retracting of the double-action cylinder is linked to steering of the set of wheels;
the tongue pivotally coupled to the axle and configured to pivot as the double-action cylinder expands or retracts to drive the set of wheels for steering;
the tie rods each connecting to an end of the tongue opposite the first end and configured to steer the wheels based on the pivoting of the tongue; and
a spring attached at one end to a protrusion from the axle and at an other end to the first end of the tongue and configured to provide a centering force to at least one of the wheels to reduce scrubbing of the at least one of the wheels.

2. The harvesting head assembly of claim 1, wherein the tongue of a first of the wheel assemblies is configured to be driven to pivot about a pivot point, drive expansion and retraction of the double-action cylinder, and drive the tie rods to steer the wheels, and the tongue of a second of the wheel assemblies is configured to be driven by the expansion and retraction of the double-action cylinder of the second of the wheel assemblies, and drive the tie rods to steer the wheels of the second of the wheel assemblies based on the expansion and retraction of the double-action cylinder.

3. The harvesting head assembly of claim 1, wherein the spring is configured to:
apply the centering force to an outside wheel of the wheels, wherein the centering force is transmitted through the tongue and the tie rods to the outside wheel; and
wherein the outside wheel is a wheel at an outermost distance from a center of a turn.

4. The harvesting head assembly of claim 3, wherein the spring connects at one end to a centering bar that is removably pinned with the tongue.

5. The harvesting head assembly of claim 1, wherein the double-action cylinder of a first of the wheel assemblies is configured to:
hydraulically link to the double-action cylinder of a second of the wheel assemblies; and
transfer hydraulic fluid from the double-action cylinder of the first of the wheel assemblies to the double-action cylinder of the second of the wheel assemblies to expand or retract the double-action cylinder of the second of the wheel assemblies.

6. The harvesting head assembly of claim 1, wherein the wheels are spaced a distance apart greater than or equal to a width of the agricultural machine.

7. A harvesting head assembly for an agricultural combine, the harvesting head assembly comprising:
a pair of wheel assemblies configured to rotate between a field mode and a transportation mode relative to a header of the harvesting head assembly, each of the wheel assemblies comprising:
a set of wheels, an axle, a tongue, and a set of tie rods;
hydraulic a double-action cylinder connected at one end to the axle and at an opposite end to a first end of the tongue, the double-action cylinder configured to expand or retract, wherein the expanding and retracting of the double-action cylinder is linked to steering of the set of wheels;

hydraulic the tongue pivotally coupled to the axle, wherein the double-action hydraulic cylinder is configured to pivot the wheels in either direction to indicate a direction of turn, wherein the double-action hydraulic cylinder of a first wheel assembly is hydraulically linked to an operation of the double-action hydraulic cylinder of a second wheel assembly configured to pivot as the double-action cylinder expands or retracts to drive the set of wheels for steering;

the tie rods each connecting to an end of the tongue opposite the first end and configured to steer the wheels based on the pivoting of the tongue; and a bias mechanism attached at one end to a protrusion from the axle and at an other end to the first end of the tongue and configured to provide a centering force to at least one of the wheels to reduce scrubbing of the at least one of the wheels.

8. The harvesting head assembly of claim 7, wherein the tongue of a first of the wheel assemblies is configured to be driven to pivot about a pivot point, drive expansion and retraction of the double-action cylinder, and drive the tie rods to steer the wheels, and the tongue of a second of the wheel assemblies is configured to be driven by the expansion and retraction of the double-action cylinder of the second of the wheel assemblies, and drive the tie rods to steer the wheels of the second of the wheel assemblies based on the expansion and retraction of the double-action cylinder.

9. The harvesting head assembly of claim 7, wherein the bias mechanism is configured to:
apply the centering force to an outside wheel of the wheels, wherein the centering force is transmitted through the tongue and the tie rods to the outside wheel; and
wherein the outside wheel is a wheel at an outermost distance from a center of a turn.

10. The harvesting head assembly of claim 9, wherein the bias mechanism connects at one end to a centering bar that is removably pinned with the tongue.

11. The harvesting head assembly of claim 7, wherein the double-action cylinder of a first of the wheel assemblies is configured to:

hydraulically link to the double-action cylinder of a second of the wheel assemblies; and transfer hydraulic fluid from the double-action cylinder of the first of the wheel assemblies to the double-action cylinder of the second of the wheel assemblies to expand or retract the double-action cylinder of the second of the wheel assemblies.

12. The harvesting head assembly of claim 7, wherein the wheels are spaced a distance apart greater than or equal to a width of the agricultural combine.

13. A harvesting head assembly for an agricultural machine, the harvesting head assembly comprising:
a pair of wheel assemblies configured to rotate between a field mode and a transportation mode relative to a header of the harvesting head assembly, each of the wheel assemblies comprising:
a set of wheels, an axle, a tongue, and a set of tie rods;
a double-action cylinder connected at one end to the axle and at an opposite end to a first end of the tongue, the double-action cylinder configured to expand or retract, wherein the expanding and retracting of the double-action cylinder is linked to steering of a set of wheels;
the tongue pivotally coupled to the axle, wherein the double-action cylinder is configured to pivot the wheels in either direction to indicate a direction of turn, wherein the double-action cylinder is expanded or retracted based on the direction and an amount of pivot of the tongue;
the tie rods each connecting to an end of the tongue opposite the first end and configured to steer the wheels based on the pivoting of the tongue; and
a bias mechanism attached at one end to a protrusion from the axle and at an other end to one end of the tongue; and configured to provide a centering force to at least one of the wheels to reduce scrubbing of the at least one of the wheels.

14. The harvesting head assembly of claim 13, wherein the bias mechanism is configured to:
apply the centering force to an outside wheel of the wheels, wherein the centering force is transmitted through the tongue and the tie rods to the outside wheel; and
wherein the outside wheel is a wheel at an outermost distance from a center of a turn.

* * * * *

UNITED STATES PATENT AND TRADEMARK OFFICE
CERTIFICATE OF CORRECTION

PATENT NO. : 11,178,806 B2
APPLICATION NO. : 16/240225
DATED : November 23, 2021
INVENTOR(S) : Jixin Chen and Michael L. Vandeven Page 1 of 1

It is certified that error appears in the above-identified patent and that said Letters Patent is hereby corrected as shown below:

In the Claims

Claim 7, Column 16, Line 65, please remove the first word [[hydraulic]].

Claim 7, Column 17, Line 4, please remove the first word [[hydraulic]].

Signed and Sealed this
First Day of November, 2022

Katherine Kelly Vidal
*Director of the United States Patent and Trademark Office*